Feb. 20, 1968 S. M. PUCKETT 3,369,310
LOADING DEVICE AND SELF-LOADING VEHICLE INCLUDING THE SAME
Filed May 14, 1965 4 Sheets-Sheet 3
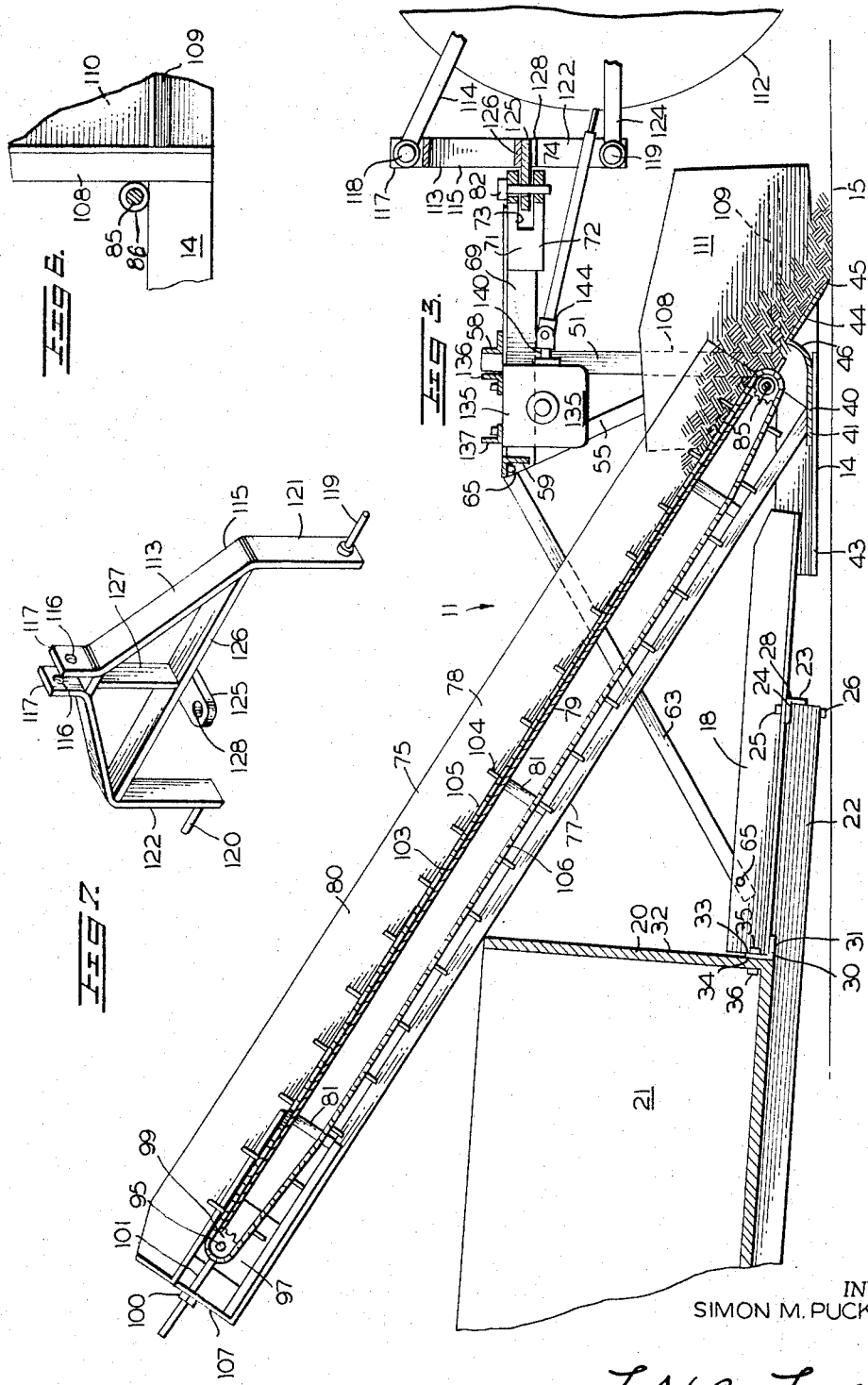
INVENTOR
SIMON M. PUCKETT
BY
ATTORNEY

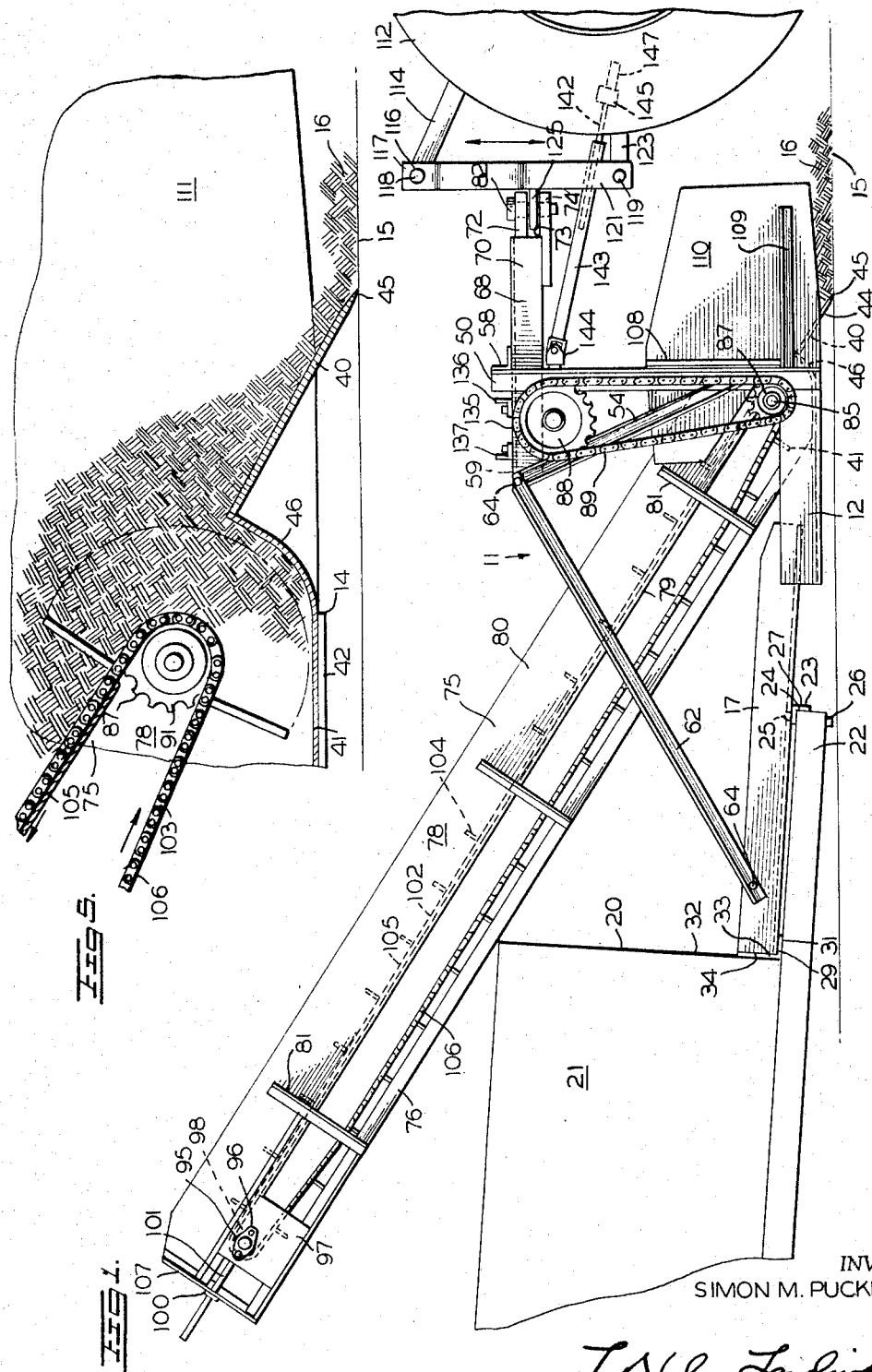

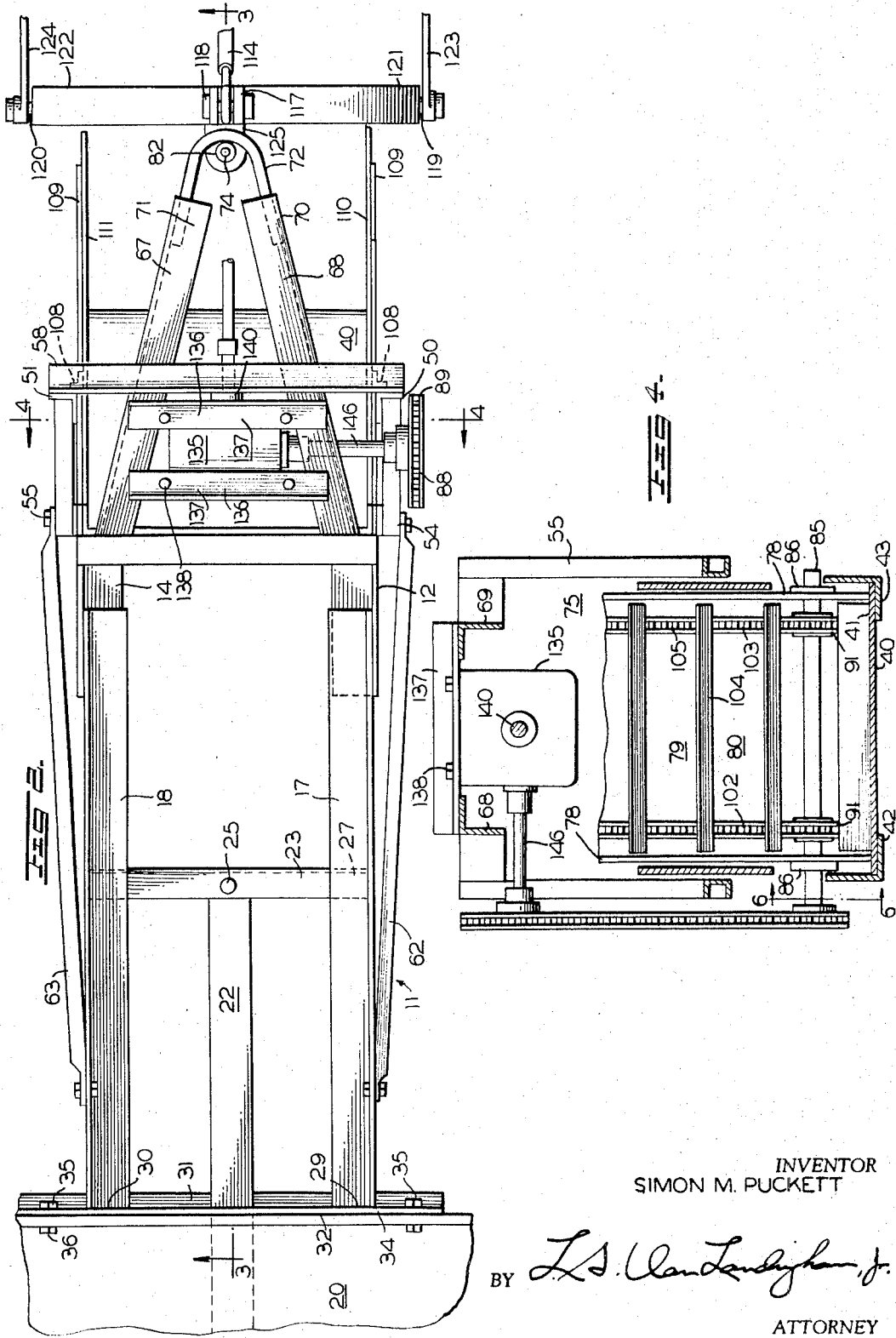

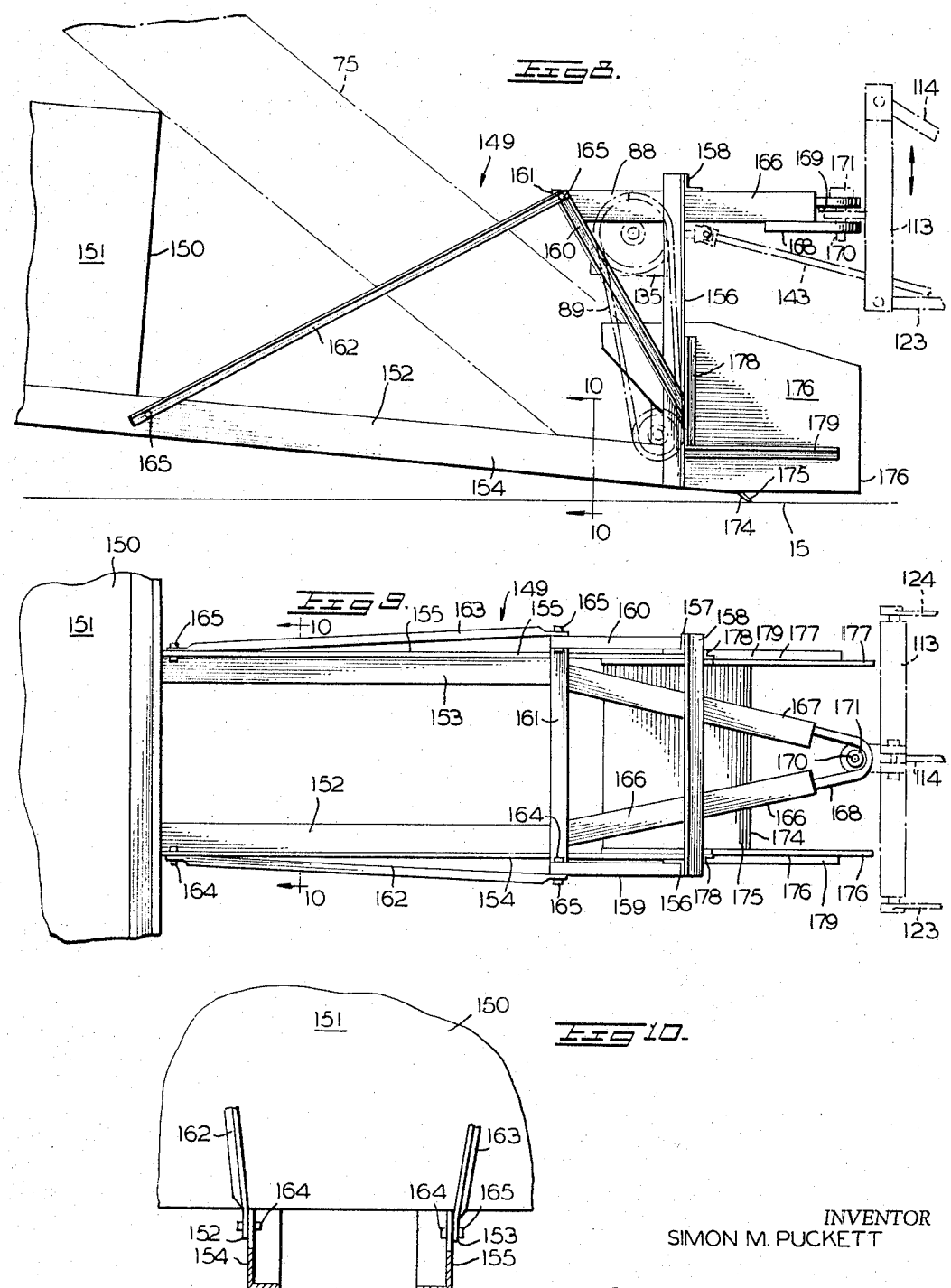

United States Patent Office 3,369,310
Patented Feb. 20, 1968

3,369,310
LOADING DEVICE AND SELF-LOADING
VEHICLE INCLUDING THE SAME
Simon M. Puckett, Rte. 1, Raleigh, Miss. 39153
Filed May 14, 1965, Ser. No. 455,862
6 Claims. (Cl. 37—8)

ABSTRACT OF THE DISCLOSURE

An improved loading device for a vehicle. The device is especially useful for loading a tractor-drawn vehicle, and it may be attached to the front end of the vehicle in such a manner that the power lift of the tractor may be used for the raising and lowering thereof, and whereby power for operating the loading device may be provided from a power take-off on the tractor.

This invention relates to an improved loading device and, in one of its more specific embodiments, to an improved loading device for a tractor-drawn vehicle. The invention further relates to a vehicle, preferably tractor-drawn, which incorporates the improved loading device of the invention to thereby provide a self-loading vehicle.

A wide variety of loading devices for tractor drawn vehicles have been proposed in the prior art. However, generally speaking such devices have not proved to be entirely satisfactory in all respects. For instance, the prior art loading devices have not been very effective for digging light and loose pulverant materials from the ground, and then loading them automatically into a trailing vehicle which is at a higher elevation. The prior art digging blades and associated apparatus used heretofore merely cause such materials to pile up and push forward, or fall to the sides of the blade, and very little is actually delivered onto a cooperating conveyor of the endless belt type for elevating the material and discharging it into a trailing vehicle.

The loading devices of the prior art also have not been designed and constructed so as to be readily attached to the front end of a prior art tractor-drawn manure spreader and to the rear end of a tractor, in a manner so that the loading device may be lowered into operating position and raised therefrom by means of the power lift, and with a cooperating elevator conveyor being provided that is driven from the power take-off on the tractor. Further, the prior art loading devices have been expensive to construct and maintain in good operating condition. They also have not been ruggedly constructed and capable of operating easily and effective over rough terrain and on short turns, without damage to the equipment.

It is an object of the present invention to provide an improved loading device such as discussed above which is especially useful in loading a tractor drawn vehicle.

It is a further object to provide an improved loading device which may be easily attached to and detached from the front end of a vehicle to be loaded and to the rear end of a tractor for drawing the vehicle, and in such a manner that the power lift of the tractor may be used for raising and lowering the loading device, and also whereby power for operating the same may be provided from the power take-off of the tractor.

It is still a further object of the present invention to provide an improved self-loading vehicle having the novel loading device of the invention incorporated therewith.

It is still a further object of the invention to provide an improved loading device or a vehicle incorporating the same of the type discossed above, which is simple and inexpensive in construction and operation, and yet which is exceedingly effective for the purpose for which it was designed.

Still other objects and advantages of the invention will be apparent to those skilled in the art upon reference to the following detailed description and the accompanying drawings, wherein:

FIGURE 1 is a side elevational view of a loading device constructed in accordance with the principles of the invention which is shown attached to the front end of a prior art vehicle to be loaded and to the rear end of a tractor for pulling the same and providing power therefor, with portions thereof being broken away in the interest of clarity;

FIGURE 2 is a top plan view of the apparatus illustrated in FIGURE 1, but with the elevator conveyor and a portion of the vehicle and tractor being omitted in the interest of clarity;

FIGURE 3 is a longitudinal sectional view taken along the line 3—3 of FIGURE 2 but including the elevator conveyor illustrated in FIGURE 1;

FIGURE 4 is a transverse sectional view taken generally along the line 4—4 of FIGURE 2 but including the elevator conveyor illustrated in FIGURE 1;

FIGURE 5 is a fragmentary enlarged longitudinal sectional view of the forward portion of the loading device of the invention illustrated in FIGURE 3, showing the manner in which the blade and associated apparatus digs the material from the surface and loads it onto the elevator conveyor;

FIGURE 6 is an enlarged fragmentary sectional view taken generally along the line 6—6 of FIGURE 4, illustrating the positioning means and associated apparatus for the elevator conveyor;

FIGURE 7 is a perspective view of a four point hitch which may be used in attaching the apparatus of the invention to a prior art tractor;

FIGURE 8 is a side elevational view illustrating a modified form of the loading device of the invention constructed integrally with the vehicle to be loaded and which is otherwise similar to FIGURE 1, with parts thereof being shown in phantom line;

FIGURE 9 is a top plan view of the apparatus of FIGURE 8 with the conveyor, gear box, sprockets and associated apparatus being omitted in the interest of clarity; and FIGURE 10 is a fragmentary, transverse sectional view taken along the line 10—10 of FIGURE 9.

Referring now to the drawings and more particularly to FIGURES 1 through 7 which illustrate one presently preferred embodiment of the invention, the loading device generally designated as 11 includes two spaced basal beams 12 and 14 which extend generally longitudinally. The spaced beams 12 and 14 preferably are angle irons as shown arranged with the internal angles facing inward and so as to be substantially parallel with respect to each other and the surface 15 from which the material 16 is to be removed and loaded. The forward ends of beams 17 and 18 overlap the rear ends of beams 12 and 14, respectively, and may be connected by welding at an angle and so as to be offset upward therefrom. The beams 17 and 18 are also preferably angle irons as shown arranged with the internal angles facing inward and are substantially parallel. The beams 17 and 18 extend rearward and upward at a small angle such as about 4 degrees and may be offset a substantial distance from beams 12 and 14 such as about 2 inches.

The vehicle 20 may be a prior art manure spreader having an open body 21 to receive the material to be loaded such as poultry manure, and may be provided with a centrally arranged single draft tongue 22 as illustrated in FIGURES 1, 2 and 3, or two similar but spaced draft tongues or members as illustrated in FIGURES 8 and 9. The upper portion of the square forward end of tongue 22 is fitted into the internal angle 24 of transversely extending angle iron 23 and is removably attached thereto by means of bolt 25 and nut 26. Similarly, the rear ends of angle irons 17 and 18 are fitted into the internal angle 33 of angle iron 31. The flat upper surface of ends 27 and 28 of angle iron 23 and portions 29 and 30 of angle iron 31 may be permanently joined to the flat under surfaces of angles irons 17 and 18 by welding, if desired. The ends of angle iron 31 are removably attached to the wall 32 of vehicle 20 by means of bolts 35 and nuts 36. It may be noted that the specific arrangement of the angle irons 17, 18, 23 and 31 offers several important advantages. Among these advantages is the provision of flat surfaces for attaching the angle irons 23 and 31 to tongue 22, wall 32 and angle irons 17 and 18 at their respective points of contact, the attachment bolts 25 and 35 are prevented from being sheared off on stopping quickly or on backing the loading device 11 when in use as substantially no rearward movement of the angle irons 17 and 18 is possible, and the vertical leg 34 of angle iron 31 distributes the large forces encountered in stopping quickly and in backing across the front wall 32 of body 21 and prevents damage thereto.

A blade 40 extends transversely between angle irons 12 and 14 and longitudinally along the forward portion thereof. The blade 40 has a substantially flat rear portion 41 which is welded to the horizontally extending legs 42 and 43 of angle irons 12 and 14, respectively, a curved portion 46 extending upward therefrom, and a forward portion 44 extending downward. The forward portion 44 extends forward of and beneath the angle irons 12 and 14 and terminates in a cutting edge 45 which is capable of removing material 16 from surface 15 by a cutting or scraping action. The forward portion 44 of blade 40 is inclined downward at an acute angle such as 30° with respect to a plane or line taken longitudinally through the center of angle irons 12 and 14, and extends downward and beneath the angle irons 12 and 14 a distance sufficient to remove material 16 from the surface 15, as the loading device 11 is pulled thereover.

Upright, substantially parallel, spaced angle iron posts 50 and 51 are welded on the flat outside surfaces of angle irons 12 and 14, respectively, with the internal angles thereof facing outward. Spaced bracing members 54 and 55 are attached by welding to a lower portion of posts 50 and 51, respectively, and extend upward and backward. Preferably, the braces 54 and 55 are channel irons and the channels face outward with the flat back sides being fitted into the internal angles of posts 50 and 51 as shown. The tops of posts 50 and 51 are connected by welding to a transversely extending angle iron 58 and the top portions of braces 54 and 55 are connected by welding to a transversely extending angle iron 59. A pair of spaced braces 62 and 63 are attached to the tops of braces 54 and 55 and extend to the outer surfaces of angle irons 17 and 18 near the rear ends thereof, respectively. Preferably, the braces 62 and 63 are formed of angle irons with the internal angles facing outward, and they are removably attached at their ends by means of bolts 64 and nuts 65 to thereby allow easy attachment and detachment. Draft beams 68 and 69 are preferably angle irons positioned as shown with their internal angles facing inward and attached at their rear ends by welding to the upper portions of channel irons 54 and 55 and to brace 59, and extend forward and angularly toward the longitudinal center line of the apparatus. As they extend forward, the flat outside surfaces of draft beams 68 and 69 are attached by welding to the flat inside surfaces of posts 50 and 51, and the flat upper surfaces are welded to the flat under surface of angle iron 58 thereby providing a bracing and strengthening action. The forward ends 70 and 71 overlap the legs of a generally U-shaped member 72 which is formed of heavy steel such as ¾ inch steel plate, and are connected thereto by welding. The member 72 is provided on its forward end with a transversely and horizontally extending slot 73 and has an opening 74 on the inner surface for receiving clevis pin 82, thereby forming an extremely strong clevis for attaching the loading device 11 to a prior art tractor to be described more fully hereinafter.

The elongated elevator conveyor 75 includes a pair of longitudinally extending substantially parallel angle irons 76 and 77 for supporting the body 80 of the conveyor, which includes side panels 78 and bottom or floor panel 79. The body 80 is supported above angle irons 76 and 77 by means of spaced upwardly extending angle irons 81 which are welded at their respective points of contact to angle irons 76 and 77 and side panels 78. The conveyor 75 is provided on its forward end with a transversely extending shaft 85 which extends through the side panels 78 and the ends thereof are mounted on bearings 86. The shaft 85 is provided on one end with sprocket 87 which is driven by sprocket 88 by means of an endless link chain 89. The shaft 85 is also provided with sprockets 90 and 91 which are mounted thereon between side panels 78. The upper end of conveyor 75 is provided with a transversely extending shaft 95 which is similar to shaft 85 and mounted at either end by means of bearings 96 carried by spaced plates 97. The shaft 95 has sprockets 98 and 99 mounted thereon which are similar to sprockets 90 and 91 and arranged between the side panels 78. The distance between the sprockets 90 and 98, and the sprockets 91 and 99 may be adjusted by tightening or loosening nut 100 on the threaded rod 101, which is attached on one end to plates 97 and on the other end extends through an opening in plate 107. Upon adjusting the nut 100, it is possible to move the plates 97 longitudinally along the conveyor 75, thereby carrying shaft 97 and sprockets 98 and 99 longitudinally along conveyor 75 to a desired point. Endless chain link belts 102 and 103 are mounted on sprockets 90 and 98 and sprockets 91 and 99, respectively, and transversely extending cleats 104 are attached thereto for transporting the material to be loaded. The upper flight or pass 105 rides on the floor panel 79. Upon driving sprockets 87 and 88 in the directions of the arrows, the belts 102 and 103 and cleats 104 move the material to be loaded continuously until it reaches sprockets 98 and 99, and then it is discharged and allowed to fall downward into body 21. The lower flight 106 moves in the opposite direction to flight 105 in the space formed between angle irons 76 and 77 and the body 80 of the conveyor.

The conveyor 75 is not attached in a positive manner to the remainder of the equipment. The forward ends of angle irons 76 and 77 merely rest upon the flat rear portion 41 of blade 40, and forward movement past a desired point is prevented by bearings 86 which abut posts 50 and 51, as best seen in FIGURE 6 of the drawings. The conveyor 75 is maintained at the desired angle by allowing the angle irons 76 and 77 to rest on the top of the forward wall 32 of the vehicle 20.

As is best seen in FIGURE 5, the cleats 104 have a height which assures a small clearance with the portions 41 and 46 of blade 40 as they pass around sprockets 90 and 91. Also, as is best seen in FIGURES 1, 3, and 5, the forward portion 44 of blade 40 preferably forms about a 30° angle with a line taken longitudinally through angle irons 12 and 14. Also, preferably the bottom panel 79 of conveyor 75 lies in substantially the same plane as the forward portion 44 of blade 40. This arrangement aids in moving the material to be loaded upward and onto the forward end of the conveyor. Spaced side panels 110 and 111 are provided to aid in collecting and transferring the material 16 removed from the surface 15 by the cutting edge 45 of blade 40. The panels 110 and 111 are attached to blade 40 and posts 50 and 51 by means of angle irons 108 and the forward ends thereof are supported by angle irons 109. The lower edges of the panels 110 and 111 do not extend downward past the lower surface of angle irons 12 and 14, and the forward ends are inclined upward slightly to prevent them from digging into surface 15. The panels 110 and 111 also extend far in front of, above and behind the forward portion 44 of blade 40, and the rear portions are arranged between the side panels 78 to deliver the material 16 into the forward end of the conveyor 75. The above discussed arrangement of cooperating parts forming the scoop-like portion of the loader produces many unusual and unexpected advantages.

The loading device 11 is attached to tractor 112 by means of the unique four-point hitch 113 illustrated in FIGURE 7 and has a modified generally A-shaped frame 115. As is best seen in FIGURES 1, 2 and 3, the tractor 112 is provided with a power lift of prior art construction including an upper arm 114 having an eye in the end thereof which is aligned with openings 116 in the spaced end portions 117 of hitch 113 and rotatively mounted on bolt 118. The hitch 113 is also provided with pins 119 and 120 on spaced lower arms 121 and 122, respectively, which receive the eyes in the two spaced lower arms 123 and 124 of the power lift. The hitch member 125 is welded to the underside of cross member 126 which is braced by member 127. The member 125 is formed of heavy plate steel and has an opening 128 therein for receiving bolt 82 when inserted into slot 73 and the openings 74 and 128 are aligned. By means of the hitch described above and the power lift of the tractor, it is possible to raise the loading device 11 upward to a running position or lower it to the loading position by merely adjusting the controls on the tractor.

A prior art gear box 135 is mounted on spaced angle irons 136 and 137 by means of bolts 138. As best seen in FIGURE 2, the angle irons 136 and 137 are welded to the upper surfaces of draft beams 68 and 69. The gear box 135 is driven by gear shaft 140, which in turn is driven by a prior art splined rotating shaft 142 that is fitted and longitudinally adjustable within tubing 143. The tubing 143 is provided on its rear end with a universal joint 144, and shaft 142 is provided on its forward end with a universal joint 145 which is connected by means of shaft 147 to the power takeoff on the tractor 112. The gear box 135 is provided with a conventional gear arrangement to reduce the number of revolutions per minute that the input shaft 142 is rotating, and thereby assure that output shaft 146 drives the sprocket 88 at a desired slower speed.

FIGURES 8, 9 and 10 of the drawings ilustrate a modified form 149 of the loading device of the invention in which the loading device is constructed integrally with the vehicle to be loaded. With the exception of the modifications in the framework and associated elements which are necessary to effect the integral construction, the general construction and operation of other portions of the apparatus remain the same as in FIGURES 1–7 and are shown in phantom line.

Referring now to FIGURES 8, 9 and 10, the vehicle 150 to be loaded has an open body 151 mounted on two spaced substantially parallel, forwardly extending angle irons 152 and 153. The internal angles of angle irons 152 and 153 face inward, thereby providing flat surfaces 154 and 155 on which upright angle iron posts 156 and 157, respectively, are welded with the internal angles facing outward as shown. The angle irons 156 and 157 are welded to angle irons 152 and 153 at an angle of approximately 85°, and the angle irons 156 and 157 are approximately vertical with respect to the surface 15 when the loading device 149 is in the loading position shown in FIGURE 1. The tops of angle irons 156 and 157 are connected by means of a transversely extending angle iron 158. Also, channel iron braces 159 and 160 are welded to angle irons 156 and 157, repectively, and extend upward and backward from lower portions on the angle irons 156 and 157, and are joined at their upper ends by means of a transverse angle iron 161. Angle iron braces 162 and 163 are attached by means of bolts 164 and nuts 165 at their upper ends to braces 159 and 160, and at their lower ends to the flat surfaces 154 and 155 of angle irons 152 and 153, respectively.

Angle iron draft beams 166 and 167 are welded on their rear ends to angle iron 161 and extend forward and inward under angle iron 158 and are attached thereto by welding. Also, a U-shaped member 168 is attached by welding to the forward ends of draft beams 166 and 167 and provided with a transversely extending slot 169. An opening 170 is provided on the inner surface of U-shaped member 168 for receiving bolt 171, thereby forming a clevis for attaching the combined loading device and vehicle 149 to the tractor hitch 113, as described previously in connection with FIGURES 1–7.

The blade 174 is attached to the angle irons 152 and 153 on their forward ends in the manner described above for FIGURES 1–7, and it has the general configuration and arrangement as described previously. However, preferably the forward portion 175 of blade 174 forms an angle of approximately 25° with a line extending longitudinally through angle irons 152 and 153. Spaced panels 171 and 177 are also provided which are mounted on blade 175 and angle irons 156 and 157 by angle irons 178 ad 179, as described above in connection with FIGURES 1–7, and the panels 176 and 177 have a configuration and arrangement as described therein. All other elements such as conveyor 75, sprocket 88, chain 89, hitch 113, gear box 135, tubing 143, and associated elements, for the self-loading vehicle 149 illustrating in FIGURES 8, 9, and 10 is as described hereinbefore in connection with FIGURES 1–7.

In operating the loading device illustrated in FIGURES 1–7, or the self-loading vehicle illustrated in FIGURES 8, 9 and 10, the loading device is lowered from an elevated running position to the loading position shown in FIGURES 1 and 8 by means of the power lift of the tractor. The blade 40 or 174 rides on the surface 15 which may be the ground in a digging or scraping relation to a layer of material such as manure to be removed therefrom. Upon advancing the loading device by pulling with the tractor with a live power take-off, the material 16 is dug or scraped from the surface 15 and it passes upward on forward portion 44 of blade 40 until it is delivered to the lower or forward end of the conveyor 75, whereupon the cleats 140 advance it up the conveyor to the upper end. The material then falls downward into the open body 21 of vehicle 20. The vehicle 20 may be a conventional manure spreader having an unloading attachment operated from the tractor. The side panels 110 and 111 prevent the material 16 from pushng to one side of the blade, or from piling up and flowing over the blade or from passing in any direction other than backward and upward and onto the lower end of conveyor 75. This is true even when a light, loose, pulverant material is being loaded which is extremely difficult and almost impossible to handle with prior art apparatus.

After completing the loading of the vehicle 20, which may be accomplished in as little as 2½–3½ minutes, the tractor operator merely touches the power lift of the tractor and raises the loading device upward until it is at a desired height above the surface 15 for transporting the load to a field, pasture or other place where it is to be spread. The power takeoff on the tractor is disengaged, and the load of material is pulled by means of the tractor to the area where it is desired to unload. Then, the spreading apparatus on the vehicle is engaged from the tractor following prior art practice, and the load is spread. The four point hitch permits the power takeoff shafts to operate freely in any position, whether loading, unloading, traveling, or making short turns, and keeps the loading device away from the tractor wheels on short turns. It is therefore apparent that when using the apparatus of the present invention, it is possible for the tractor operator to both load and unload the vehicle 20 without leaving the tractor, and all in a matter of a very few minutes. This completely eliminates all hand labor normally associated with such loading and unloading operations and thereby greatly reduces cost.

In the embodiment of the invention illustrated in FIGURES 1–7, especially good results are obtained in overcoming the difficulties previously experienced when loading loose, pulverant material such as chicken manure, by a unique arrangement of elements one to the other, as follows:

(1) The approximately two inch offset and four degree angle that angle irons 12 and 17 and 14 and 18, respectively, preferably have to each other permits (a) the elevator conveyor 75 to be set low behind the blade 40, and at a relatively low angle, which permits much faster and easier loading; (b) the attachment angle iron 23 to be set on top of the tongue 22 and with the internal angle fitted over the end thereof as shown in FIGURE 1, to thereby prevent shearing of the attachment bolts on backing or stopping quickly; and (c) the posts 50 and 51 to be attached to angle irons 12 and 14, respectively at right angles, so that transverse angle iron 58 may have a right angle to posts 50 and 51 and draft beams 68 and 69 may have a right angle to posts 50 and 51 and transverse angle iron 58, to thereby allow the draft hitch to the tractor to work freely and easily in either loading or traveling positions.

(2) The approximately thirty degree angle setting of the forward portion 44 of the blade 40 with respect to basal beams 12 and 14, which is preferably also in alignment with the bottom panel 79 of the conveyor, aids in faster and easier loading; and (3) The extension of the side panels 110 and 111 far in front, above and behind the portion 44 of blade 40 and into the lower end of the conveyor, prevents the loose, light pulverant chicken manure from pushing ahead of the blade, over the side of the blade, or otherwise escaping, and all of the manure removed from the surface 15 by blade 40 is delivered upward and onto the conveyor 75.

The above described unusual and unexpected results are also obtained with the self-loading vehicle described, by the following:

(1) The angle irons 152 and 153 are formed integrally with the vehicle 150 to be loaded and extend forward thereof, with the post or angle irons 156 and 157 being attached at approximately an 85° angle;

(2) The blade 175 is set at approximately a 25° angle with respect to a line extending longitudinally through the angle irons 152 and 153, and preferably the bottom panel 79 of the conveyor is in alignment therewith; and (3) The side panels 176 and 177 perform the same function discussed above in connection with FIGURES 1–7.

The framework for the loading device is constructed almost entirely of angle irons or channel irons which are so arranged that flat surfaces are provided at their points of attachment, thereby allowing strong joints to be made conveniently by welding or bolting. Further, the legs of the angle or channel irons are largely arranged either longitudinally or transversely, thereby providing great strength in the longitudinal direction and in the vertical direction. Thus, the directions of strength which are inherent in the angle and channel iron construction are in the same directions as the maximum forces that act on the apparatus when in use. Additionally, bracing action is provided at numerous points. As a result, the loading device of the present invention has proved to be almost indestructible even when used over rough terrain and with heavy loads.

The foregoing detailed description and the illustrative drawing are for purposes of illustration only, and are not intended as being limiting to the spirit or scope of the appended claims.

What is claimed is:

1. A loading device for a tractor drawn vehicle which includes a material receiving body comprising at least one elongated longitudinally extending member having a forward portion and a rearward portion, means for attaching the rearward portion of the longitudinally extending member to a vehicle having a material receiving body to be loaded, means for attaching the forward portion of the longitudinally extending member to a tractor whereby the loading device and the vehicle may be drawn by the tractor including a generally A-shaped frame, the A-shaped frame including a pair of side legs, means joining the side legs near their upper ends to form an apex for the A-shaped frame, the side legs extending outwardly and downwardly from the apex whereby the portions of the side legs beneath the apex are spaced, a cross member extending between the spaced side legs and attached thereto at points intermediate the apex and the lower ends of the side legs, ataching means on the cross member located at a point intermediate the side legs for attaching the A-shaped frame to the loading device, and attaching means on the apex and the lower ends of each of the side legs for attaching the A-shaped frame to the tractor, an elongated driven elevator conveyor, means for retaining the conveyor in an inclined position with respect to the longitudinally extending member, means for driving the conveyor whereby material is passed up the inclined conveyor, the lower end of the conveyor being carried by means including the longitudinally extending member and the conveyor being inclined upward therefrom and extending rearward into a position over the vehicle whereby material is discharged from the upper end into the body of the vehicle, a blade having a cutting edge on the end thereof for removing material to be loaded from a surface, means carried by means including the longitudinally extending member for mounting the blade with the cutting edge positioned forward of the lower end of the conveyor, the blade being mounted whereby at least a forward portion thereof including the cutting edge extends forward and downward from the longitudinally extending member, the forward portion of the blade forming an acute angle with a line taken longitudinally through the longitudinally extending member and extending downward whereby the cutting edge is beneath the longitudinally extending member a distance sufficient to remove material from a surface as the loading device is pulled thereover, the forward portion of the blade being inclined upward from the cutting edge to a height whereby material removed from the surface is elevated and delivered to the lower end of the conveyor, spaced panel means, the blade being disposed between the spaced panel means, the panel means extending in front and above the forward portion of the blade and rearward over the lower end of the conveyor a distance whereby material removed from a surface by the cutting edge as the loading device and vehicle are pulled thereover is passed upward and rearward, collected between the panels and fed onto the lower end of the conveyor, and then passed up the conveyor and discharged into the body of the vehicle.

2. A loading device for a tractor drawn vehicle which includes a material receiving body comprising two substantially parallel spaced longitudinally extending basal members having forward portions and rearward portions, the rearward portions being angularly disposed with respect to the forward portions and forming about a 4 degree angle therewith, means including two spaced substantially parallel longitudinally and rearwardly extending members and two spaced members extending transversely therebetween for attaching the rearward portions of the longitudinally extending basal members to a vehicle having a material receiving body to be loaded, means for attaching the forward portions of the longitudinally extending basal members to a tractor whereby the loading device and the vehicle may be drawn by the tractor including a generally A-shaped frame, the A-shaped frame including a pair of side legs, means joining the side legs near their upper ends to form an apex for the A-shaped frame, the side legs extending outwardly and downwardly from the apex whereby the portions of the side legs beneath the apex are spaced, a cross member extending between the spaced side legs and attached thereto at points intermediate the apex and the lower ends of the side legs, attaching means on the cross member located at a point intermediate the side legs for attaching the A-shaped frame to the loading device, and attaching means on the apex and the lower ends of each of the side legs for attaching the A-shaped frame to the tractor, a blade having a cutting edge on the end thereof for removing material to be loaded from a surface, means carried by the spaced longitudinally extending basal members for mounting the blade therebetween, the blade being mounted whereby at least a forward portion thereof including the cutting edge extends forward and downward from the longitudinally extending basal members, the forward portion of the blade forming an acute angle of about 30 degrees with a line taken longitudinally through the longitudinally extending basal members and extending downward whereby the cutting edge is beneath the longitudinally extending basal members a distance sufficient to remove material from a surface as the loading device is pulled thereover, conveyor means for passing the material removed from the surface by the blade into the body of the vehicle, the forward portion of the blade being inclined upward from the cutting edge to a height whereby material removed from the surface is elevated and delivered toward the conveyor, space panel means, the blade being disposed between the spaced panel means, the panel means extending far in front and above the forward portion of the blade and over the conveyor a distance whereby material removed from the surface by the cutting edge as the loading device and vehicle are pulled thereover is passed upward and rearward, collected between the panels and fed onto the conveyor and then passed by the conveyor into the body of the vehicle.

3. A loading device for a tractor drawn vehicle which includes a material receiving body comprising two spaced longitudinally extending members having forward ends and rearward ends, means for attaching the rearward ends of the longitudinally extending members to a vehicle having a material receiving body to be loaded, an upright post attached to each of the forward ends of the longitudinally extending members, a first tranversely extending member connecting the upper ends of the posts, a brace attached to a lower portion of each of the posts and extending upwardly and rearwardly from the point of attachment, a second transversely extending member connecting the upper ends of the upwardly and rearwardly extending braces, a brace attached to each end of the second transversely extending member and extending downwardly and rearwardly therefrom, a draft member attached near each end of the second transversely extending member, the draft member extending forwardly and inwardly and also being attached to the first transversely extending member, means for attaching the forwards ends of the draft members to a tractor whereby the loading device and the vehicle may be drawn by the tractor, an elongated driven elevator conveyor, means for retaining the conveyor in an inclined position with respect to the longitudinally extending members, means for driving the conveyor whereby material is passed up the inclined conveyor, the lower end of the conveyor being carried by means including the longitudinally extending members and the conveyor being inclined upward therefrom and extending rearward into a position over the vehicle whereby material is discharged from the upper end into the body of the vehicle, a blade having a cutting edge on the end thereof for removing material to be loaded from a surface, means carried by means including the longitudinally extending members for mounting the blade with the cutting edge positioned forward of the lower end of the conveyor, the blade being mounted whereby at least a forward portion thereof including the cutting edge extends forward and downward from the longitudinally extending members, the forward portion of the blade forming an acute angle with a line taken longitudinally through the longitudinally extending members and extending downward whereby the cutting edge is beneath the longitudinally extending members a distance sufficient to remove material from a surface as the loading device is pulled thereover, the forward portion of the blade being inclined upward from the cutting edge to a height whereby material removed from the surface is elevated and delivered to the lower end of the conveyor, spaced panel means, the blade being disposed between the spaced panel means, the panel means extending in front and above the forward portion of the blade and rearward over the lower end of the conveyor a distance whereby material removed from a surface by the cutting edge as the loading device and vehicle are pulled thereover is passed upward and rearward, collected between the panels and fed onto the lower end of the conveyor, and then passed up the conveyor and discharged into the body of the vehicle.

4. The loading device of claim 3 wherein the forward portion of the blade forms about a 30° angle with a line taken longitudinally through the basal members.

5. The loading device of claim 3 wherein the panel means extends far in front and above the forward portion of the blade, and the means for attaching the forward ends of the draft members to a tractor includes a generally A-shaped frame, the A-shaped frame including a pair of side legs, means joining the side legs near their upper ends to form an apex for the A-shaped frame, the side legs extending outwardly and downwardly from the apex whereby the portions of the side legs beneath the apex are spaced, a cross member extending between the spaced side legs for attaching the A-shaped frame to the loading apex and the lower ends of the side legs, attaching means on the cross member located at a point intermediate the side legs for attaching the A-shaped frame to the loading device, and attaching means on the apex and the lower ends of each of the side legs for attaching the A-shaped frame to a tractor.

6. The loading device of claim 3 wherein the means for attaching the reaward ends of said first mentioned members comprise spaced longitudinally extending members which are angularly disposed with respect to said first mentioned members forming about a 4° angle.

References Cited

UNITED STATES PATENTS

| | | | |
|---|---|---|---|
| 1,142,197 | 6/1915 | Murphy | 37—8 |
| 1,639,871 | 8/1927 | Walch | 37—8 X |
| 3,030,714 | 4/1962 | Sassmann et al. | |

ABRAHAM G. STONE, *Primary Examiner.*

A. E. KOPECKI, *Assistant Examiner.*